Patented Dec. 3, 1940

2,223,885

UNITED STATES PATENT OFFICE 2,223,885

HALOGENATED DERIVATIVES OF ACETOPROPANE

Edwin R. Buchman, Pasadena, Calif., assignor to Research Corporation, New York, N. Y., a corporation of New York No Drawing. Application June 11, 1938, Serial No. 213,189

12 Claims. (Cl. 260—488)

This invention relates to the production of halogenated derivatives of acetopropane and has for its objects the provision of such derivatives and of useful and effective methods of producing them. Halogenated compounds of the type to which this invention relates are useful in the synthesis of vitamin $B_1$ which has extremely valuable therapeutic and nutritional properties.

This application is a continuation in part of my copending application, Serial No. 171,905, filed October 30, 1937, which in turn is a continuation in part of my applications, Serial No. 11,683, filed March 18, 1935, and Serial No. 98,929, filed September 1, 1936.

In accordance with the invention, halogenated derivatives of acetopropane embodying the invention may be prepared by the halogenation of such compounds as γ acetopropyl amines, γ acetopropyl halides, γ acetopropyl esters, and other derivatives of γ acetopropane which may be converted into γ acetopropyl alcohol without causing other modifications of the compounds.

One process embodying the invention comprises the halogenation of esters of γ acetopropyl alcohol. A typical example of this type of reaction is the halogenation of γ acetopropyl acetate by the action of a sulfuryl halide or by treatment with a halogen.

According to one specific process of this type 14.4 grams of γ acetopropyl acetate (prepared by the method of Lipp. Ber. 22, 1203 (1898), or by the hydrolysis of acetobutyrolactone in glacial acetic acid) are chlorinated with 15.5 grams of sulfuryl chloride at 0° C. under anhydrous conditions for one-half hour. Then two volumes of ether are added and the resulting solution is heated on the steam bath to remove the remaining sulfur dioxide and hydrogen chloride. The product is then poured into ice water, the mixture made alkaline with potassium carbonate and then extracted repeatedly with ether. The ethereal solution is first dried over sodium sulfate and then over anhydrous potassium carbonate, after which the ether is distilled off in vacuo. The residue is fractionally distilled in vacuo and pure γ chlor γ acetopropyl acetate, which has a boiling point of 72° C. at 1 mm. pressure, is obtained.

By a similar reaction γ brom γ acetopropyl acetate may be prepared by reacting upon γ acetopropyl acetate with sulfuryl bromide. Instead of using sulfuryl halides as the halogenating agents, the elemental halogens may be substituted with satisfactory results. Thus, γ acetopropyl acetate may be reacted upon by chlorine, bromine and iodine to introduce these halogens in the γ position of the propyl group in this compound.

It is also possible to produce γ halogen derivatives of γ acetopropyl acetate by treating α halogen derivatives of α aceto γ butyrolactone with acetic acid in the presence of a strong acid such, for example, as hydrochloric acid. In this reaction the lactone is hydrolized to the acetopropyl alcohol and the latter combines with the acetic acid to form the acetate. The halogenated lactone employed may be prepared in accordance with the method outlined in Patent 2,193,858, dated March 19, 1940.

If desired, the halogenated γ acetopropyl acetate produced in accordance with the above described processes may be converted into the corresponding halogenated γ acetopropyl alcohol by hydrolysis. For example, the halogenated acetate may be heated with a dilute solution of hydrochloric acid to hydrolize it into the corresponding alcohol. Conversely, the halogenated acetopropyl acetate may be obtained from the alcohol, if desired, by treating the latter with acetic acid.

Instead of employing γ acetopropyl acetate, esters of the other common carboxy organic acids may be substituted. For example, the γ acetopropyl esters of formic, propionic, butyric and benzoic acids may be halogenated by reacting thereon with the sulfuryl halides and halogens mentioned hereinabove in connection with the halogenation of acetopropyl acetate. These resulting halogenated esters may likewise be hydrolized to produce the corresponding halogenated γ acetopropyl alcohol, if desired.

The halogenated acetopropyl esters obtained by practising any of these halogenating operations may have either of the following structures:

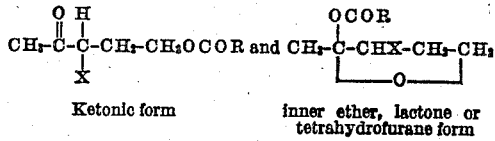

Ketonic form     Inner ether, lactone or tetrahydrofurane form where X represents a halogen. It is also possible to visualize a straight chain enolic form of these compounds. It is probable that the reaction mixtures resulting from these processes contain some or all of these forms. Since this invention pertains primarily to the production of halogenated compounds suitable for use in the synthesis of the antineuritic vitamin or derivatives thereof and in this synthesis the compounds react as if they possess the form represented by the first of these formulae, that is the ketonic form, the products have been so designated herein.

It is also within the purview of the invention to prepare compounds of the general type $$CH_3COCHXCH_2CH_2Y$$

where X is a halogen and Y is an amino group, a halogen or any suitable group which may be converted into or replaced by a hydroxyl group without altering the rest of the compound. If it is desired to produce the corresponding γ halogen derivative of γ acetopropyl alcohol from one of these compounds, the group or element represented by Y may be converted into or replaced by a hydroxyl group by well known methods with which persons skilled in the art are thoroughly familiar. For example, an amino group may be replaced by treatment of the compound with nitrous acid and a halogen may be replaced by treatment with potassium acetate and subsequent hydrolysis of the acetate so formed. It should be noted that when the symbol Y in the formula $CH_3COCHXCH_2CH_2Y$ represents a halogen, the resulting compound is still an ester although an ester of a hydrohalic acid instead of an ester of an organic acid such as γ acetopropyl acetate.

The halogenated derivatives of γ acetopropane produced in accordance with the invention may be condensed with thio formamide in accordance with the method outlined in my copending application, Serial No. 11,682, filed March 13, 1935, to produce thiazole derivatives, which may in turn enter into other reactions to produce synthetic vitamin $B_1$ and other related compounds having comparable physiological and therapeutic properties. Thus, for example, γ brom γ acetopropyl alcohol may be condensed with thio formamide to produce the hydrobromide of 4-methyl-5-β-hydroxy-ethyl thiazole, while γ chlor γ acetopropyl acetate when so treated yields the hydrochloride of 4-methyl-5-β-acetoxy-ethyl-thiazole.

In view of the fact that iodine reacts less effectively than do chlorine, bromine, sulfuryl chloride and sulfuryl bromide in the direct halogenation of the aforementioned compounds, the γ iodo compounds may be prepared, if desired, by replacing the chlorine or bromine in one of the γ chlor or γ brom compounds with iodine. For example, γ chlor γ acetopropyl acetate may be converted into the γ iodo compound by treatment with sodium iodide.

In carrying out this procedure, 44.6 grams of γ chlor γ acetopropyl acetate dissolved in ethyl alcohol are treated with 37.5 grams of sodium iodide, the mixture shaken and allowed to stand over night. The alcohol is then removed by distillation in vacuo, 5–6 volume of water are added to the residue and the solution is extracted with ether. The ether is then dried and distilled off in vacuo, leaving impure γ iodo γ acetopropyl acetate. This compound is rather unstable and is somewhat difficult to isolate in pure form, but the impure compound obtained as described hereinbefore may be condensed at once with thio formamide dissolved in ethyl alcohol to form the hydro-iodide of 4-methyl-5-β-acetoxy-ethyl-thiazole in the manner described with reference to the corresponding chlorine compound.

By a similar treatment γ iodo γ acetopropyl alcohol may be prepared from the corresponding chlorine and bromine compounds by treatment of the latter with sodium iodide, and the other chlorinated and brominated esters described hereinbefore may be converted into the iodo compounds in a like manner.

What is claimed is:

1. The process of preparing halogenated derivatives of acetopropane, which comprises reacting upon a γ acetopropyl ester of a carboxylic acid with sulfuryl chloride.

2. The process of preparing halogenated derivatives of acetopropane, which comprises reacting upon a γ acetopropyl ester of a carboxylic acid with a halogenating agent from the group consisting of chlorine, bromine, iodine, sulfuryl chloride and sulfuryl bromide.

3. The process of preparing halogenated derivatives of acetopropane, which comprises reacting upon γ acetopropyl acetate with a halogenating agent from the group consisting of chlorine, bromine, iodine, sulfuryl chloride and sulfuryl bromide.

4. The process of preparing a γ chlor derivative of acetopropane, which comprises reacting upon γ acetopropyl acetate with sulfuryl chloride.

5. The process of preparing halogenated derivatives of γ acetopropyl alcohol which comprises making a γ halogen derivative of a γ acetopropyl ester of a carboxylic acid, in which the halogen is a member of the group chlorine, bromine and iodine, and replacing the ester portion of the resulting compound by the hydroxyl group.

6. The process of preparing halogen derivatives of γ acetopropyl alcohol which comprises treating a γ acetopropyl ester of a carboxylic acid with a halogenating agent from the group consisting of chlorine, bromine, iodine, sulfuryl chloride and sulfuryl bromide, and hydrolizing the resulting compound.

7. The process of preparing a halogenated derivative of γ acetopropyl alcohol which comprises hydrolizing a γ halogen derivative of γ acetopropyl acetate in which the halogen is a member of the group chlorine, bromine and iodine.

8. A chemical compound falling within the group consisting of the γ chlor, γ brom, and γ iodo derivatives of γ acetopropyl acetate.

9. The chemical compound γ chlor γ acetopropyl acetate.

10. The chemical compound γ brom γ acetopropyl acetate.

11. The chemical compound γ iodo γ acetopropyl acetate.

12. A chemical compound falling within the group consisting of the γ chlor, γ brom, and γ iodo derivatives of γ acetopropyl esters of carboxylic acids.

EDWIN R. BUCHMAN.